US012079024B2

(12) United States Patent
Li et al.

(10) Patent No.: US 12,079,024 B2
(45) Date of Patent: Sep. 3, 2024

(54) FORCE FEEDBACK DEVICE

(71) Applicant: AAC Acoustic Technologies (Shanghai)Co., Ltd., Shanghai (CN)

(72) Inventors: Yuntong Li, Shenzhen (CN); Bing Xie, Shenzhen (CN); Liang Jiang, Shenzhen (CN); Feng Yan, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 0 days.

(21) Appl. No.: 18/091,338

(22) Filed: Dec. 29, 2022

(65) Prior Publication Data

US 2024/0053788 A1 Feb. 15, 2024

Related U.S. Application Data

(63) Continuation of application No. PCT/CN2022/118139, filed on Sep. 9, 2022.

(30) Foreign Application Priority Data

Aug. 10, 2022 (CN) ........................ 202210956177.3

(51) Int. Cl.

| | |
|---|---|
| ***G05G 5/03*** | (2008.04) |
| ***G05G 1/015*** | (2008.04) |
| ***G05G 1/04*** | (2006.01) |
| ***G05G 5/05*** | (2006.01) |
| ***H01H 3/00*** | (2006.01) |

(52) U.S. Cl.

CPC ............... *G05G 5/03* (2013.01); *G05G 1/015* (2013.01); *G05G 1/04* (2013.01); *G05G 5/05* (2013.01); *G05G 2505/00* (2013.01); *H01H 2003/008* (2013.01)

(58) Field of Classification Search

CPC .. G05G 1/04; G05G 5/03; G05G 5/05; G05G 2025/00; F16H 1/06; F16H 1/20; H01H 2003/008

See application file for complete search history.

(56) References Cited

U.S. PATENT DOCUMENTS

| | | | | |
|---|---|---|---|---|
| 2017/0203208 | A1* | 7/2017 | Sato | A63F 13/245 |
| 2017/0209649 | A1* | 7/2017 | Wei | A61M 5/31581 |
| 2018/0345136 | A1* | 12/2018 | Schmitz | G06F 3/0362 |
| 2019/0247973 | A1* | 8/2019 | Zhong | B24B 55/00 |
| 2022/0305375 | A1* | 9/2022 | Morita | G05G 5/03 |

* cited by examiner

*Primary Examiner* — Charles A Fox
*Assistant Examiner* — Gregory T Prather
(74) *Attorney, Agent, or Firm* — W&G Law Group

(57) ABSTRACT

The present application provides a force feedback device, including a base; a button assembly, comprising a button body, a button formed by protruding and extending the button body away from the base, a first rotary shaft connected to one side of the button body close to the base and rotatably connected to the base, and a swing rod formed by extending on one side of the button body close to the base and rotatably connected to the first rotary shaft; a driving assembly including a driving unit fixed to one side of the base and an output shaft connected to the driving unit; a gear assembly rotatably arranged on the base. One end of the gear assembly is connected to the output shaft, and the other end thereof is connected to the swing rod.

6 Claims, 4 Drawing Sheets

FORCE FEEDBACK DEVICE

TECHNICAL FIELD

The present application relates to the technical field of force feedback, in particular to a force feedback device.

BACKGROUND

With the development of network technologies and electronic information technologies, more and more game developments, the development of various operation handles, virtual reality devices, and augmented reality devices, and the sensory requirements of users when using external devices are also increasing.

In the related art, various types of handles or triggers on external devices are directly connected to buttons and cannot be adjusted according to different game scenes. Some handles merely provide certain vibration feedback, so it is difficult to provide an excellent game experience for a user, failing to provide the user with an immersive game experience. As an essential characteristic of tactile feedback, force feedback attracts more and more attention along with the development of different electronic devices, especially the evolution of personal consumer electronic products.

However, the force feedback in the related art only achieves a certain force effect through a spring and a vibration motor, which is relatively simple and cannot provide an excellent user experience.

Therefore, it is necessary to provide a new force feedback device to solve the above-mentioned problem.

SUMMARY

The technical problem to be solved by the present application is to provide a force feedback device with a compact overall space, reliable transmission, large force feedback output, and an excellent user experience effect.

In order to solve the above-mentioned technical problem, the present application provides a force feedback device, comprising:

- a base;
- a button assembly, comprising a button body; a button formed by protruding and extending from the button body in a direction away from the base; a first rotary shaft connected to one side of the button body close to the base and rotatably connected to the base; and a swing rod formed by extending from one side of the button body close to the base and rotatably connected to the first rotary shaft;
- a driving assembly comprising a driving unit fixed to one side of the base and an output shaft connected to the driving unit; and
- a gear assembly rotatably arranged on the base, one end of the gear assembly being connected to the output shaft in a transmission manner, and the other end of the gear assembly being connected to the swing rod in a transmission manner.

In one embodiment, the gear assembly comprises: a first gear fixed to the output shaft; a second rotary shaft arranged on the base and connected to the base; a third rotary shaft arranged on the base and connected to the base; a first duplex gear connected to the second rotary shaft; and a second duplex gear connected to the third rotary shaft; wherein a large gear of the first duplex gear is meshed with the first gear; a small gear of the first duplex gear is meshed with a large gear of the second duplex gear; the swing rod is provided with an inner tooth structure close to the second duplex gear, and the inner tooth structure is meshed with a small gear of the second duplex gear.

In one embodiment, a diameter of the first gear is smaller than a diameter of the first duplex gear, and a diameter of the first duplex gear is smaller than a diameter of the second duplex gear.

In one embodiment, the swing rod is contacted with or separated from the button body.

In one embodiment, the swing rod comprises: a connecting portion fixed to one end of the first rotary shaft; an extending portion extended from the connecting portion to the gear assembly; and a transmission portion extended from the extending portion; wherein a cross-sectional area of the extending portion is gradually increased in a direction from the connection portion to the transmission portion; the transmission portion is provided with an arc structure, and an inner side of the transmission portion is provided with an inner tooth structure.

In one embodiment, the force feedback device further comprises a cover detachably fixed to the base and located outside the swing rod, wherein the cover is protruded to form an arc-shaped protrusion; an end of the extending portion is provided with an arc-shaped limiting portion, and the limiting portion is contacted with the arc-shaped protrusion to achieve mutual limiting.

In one embodiment, the arc-shaped protrusion is located on an axis of the second duplex gear.

In one embodiment, the force feedback device further comprises a first position sensor and a second position sensor, wherein the first position sensor is fixed on the third rotary shaft, and the second position sensor is fixed on one side of the button body close to the base.

In one embodiment, the second position sensor comprises a Hall sensor fixed on the base and a magnetic steel fixed on the button body, wherein the Hall sensor is located within a magnetic field range of the magnetic steel.

In one embodiment, the force feedback device further comprises a torsion spring, wherein the torsion spring is sleeved on the first rotary shaft, one end of the torsion spring is snap-fitted with the button, and the other end of the torsion spring is snap-fitted with the base.

Compared with the related art, in the force feedback device of the present application, a button assembly is provided on a base for operation. Since the button assembly includes a button body, a button formed by protruding and extending from the button body in a direction away from the base, a first rotary shaft connected to one side of the button body close to the base and rotatably connected to the base, and a swing rod formed by extending from one side of the button body close to the base and rotatably connected to the first rotary shaft. The driving assembly includes a driving unit fixed on one side of the base and an output shaft connected to the driving unit. The gear assembly is rotatably arranged on the base. One end of the gear assembly is connected to the output shaft in a transmission manner, and the other end of the gear assembly is connected to the swing rod in a transmission manner. The output shaft is driven by the driving unit to rotate forwards and backwards to drive the gear assembly to rotate to achieve a swinging effect on the swing rod, thereby driving the first rotary shaft to rotate on the base and further achieving a force feedback effect on a button fixed on the first rotary shaft. The force feedback device of the present application has the advantages of compact overall space, reliable transmission, and large force feedback output, thereby facilitating the improvement of the user experience effect.

BRIEF DESCRIPTION OF THE DRAWINGS

In order to describe the technical solutions in the embodiments of the present application more clearly, the accompanying drawings required for describing the embodiments will be briefly introduced as follows. Apparently, the accompanying drawings in the following description show merely some embodiments of the present application, and those of ordinary skill in the art may still derive other drawings from these accompanying drawings without creative efforts.

DETAILED DESCRIPTION OF THE EMBODIMENTS

The technical solutions in the embodiments of the present application will be clearly and completely described with reference to the accompanying drawings in the embodiments of the present application. Apparently, the embodiments to be described are only a part rather than all of the embodiments of the present application. All other embodiments obtained by those of ordinary skill in the art based on the embodiments of the present application without creative efforts shall belong to the protection scope of the present application.

Figure 1:
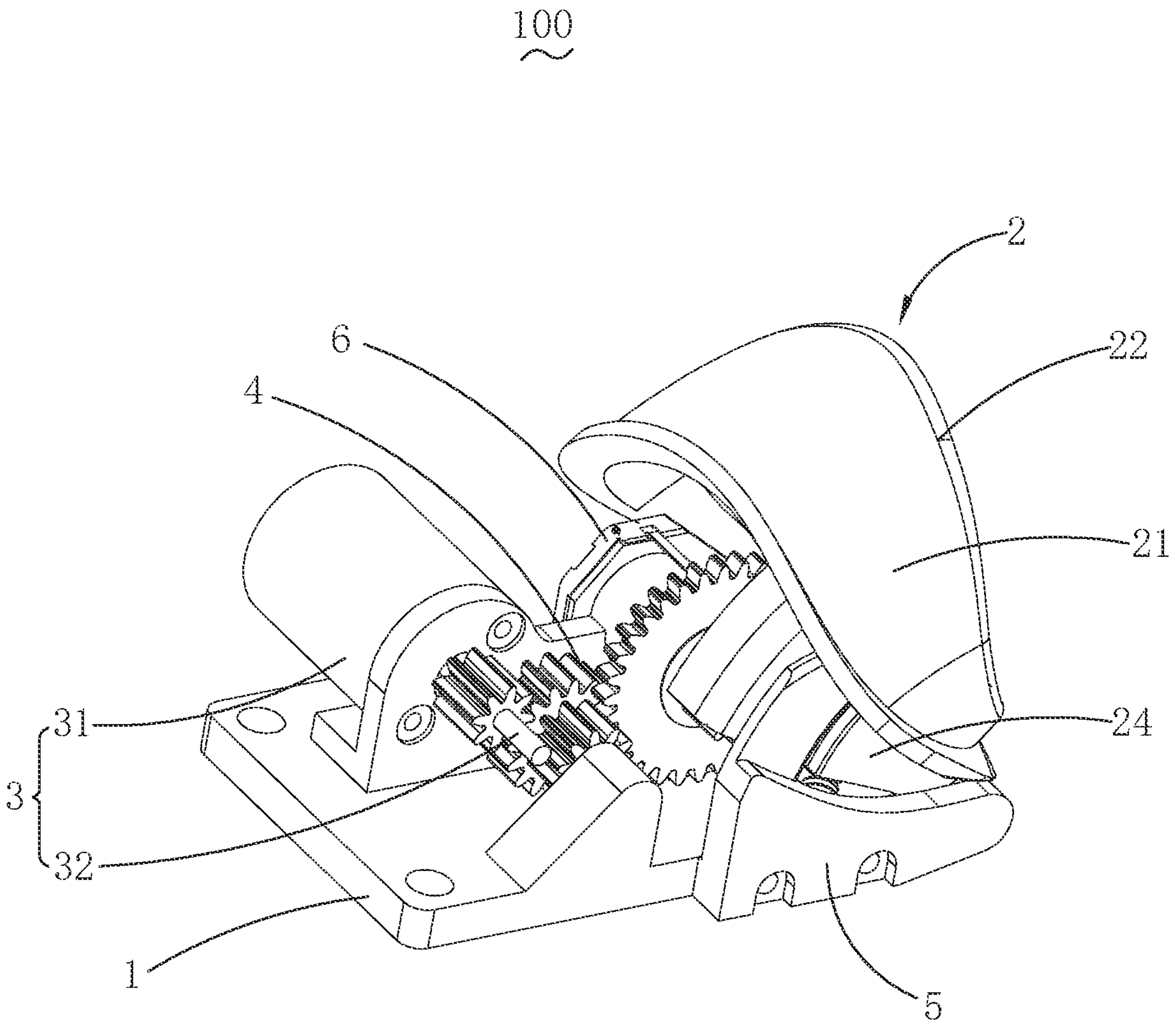
FIG. 1 is a structural view of a force feedback device according to an embodiment of the present application.
Figure 2:
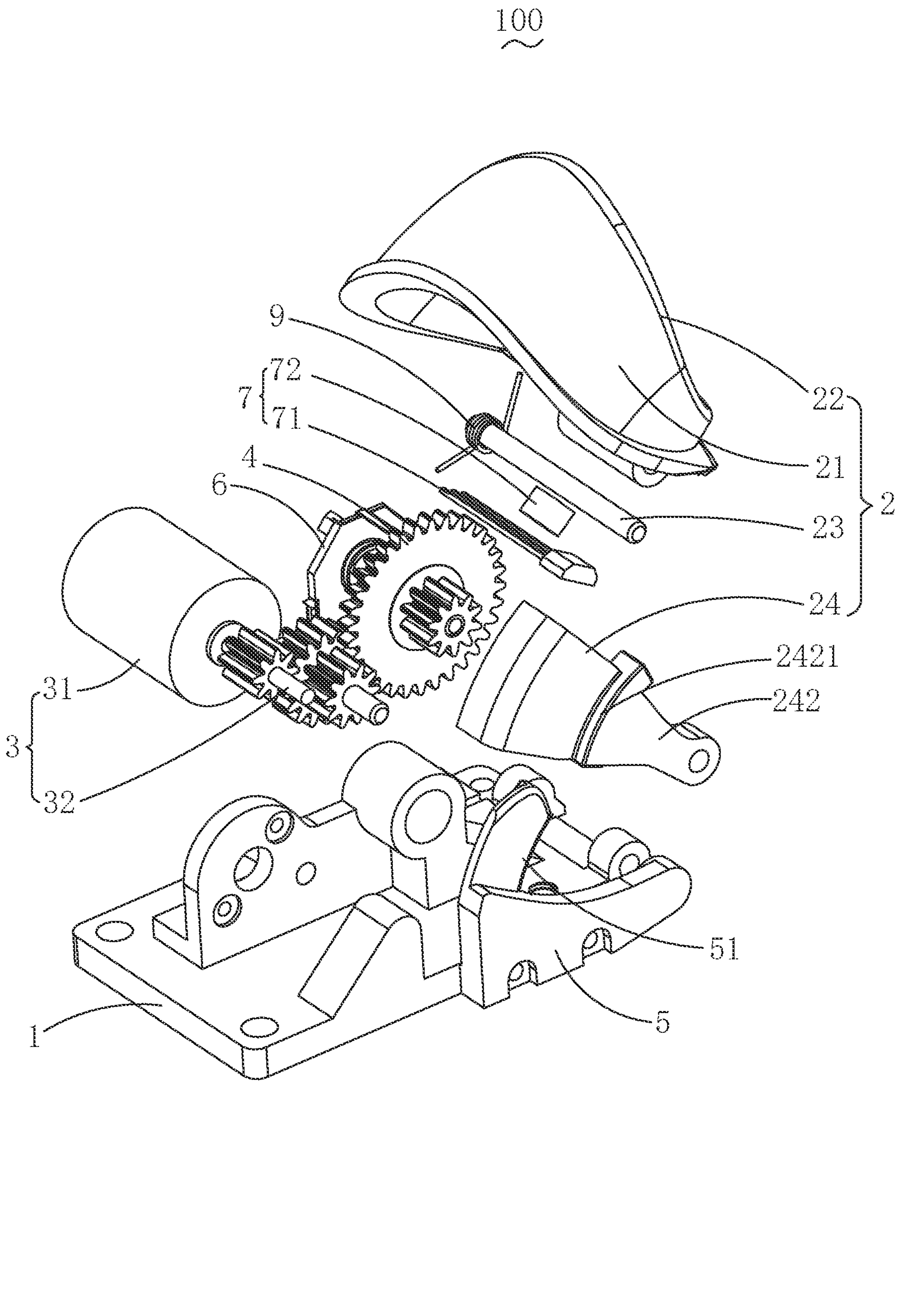
FIG. 2 is an exploded view of FIG. 1.
Figure 3:
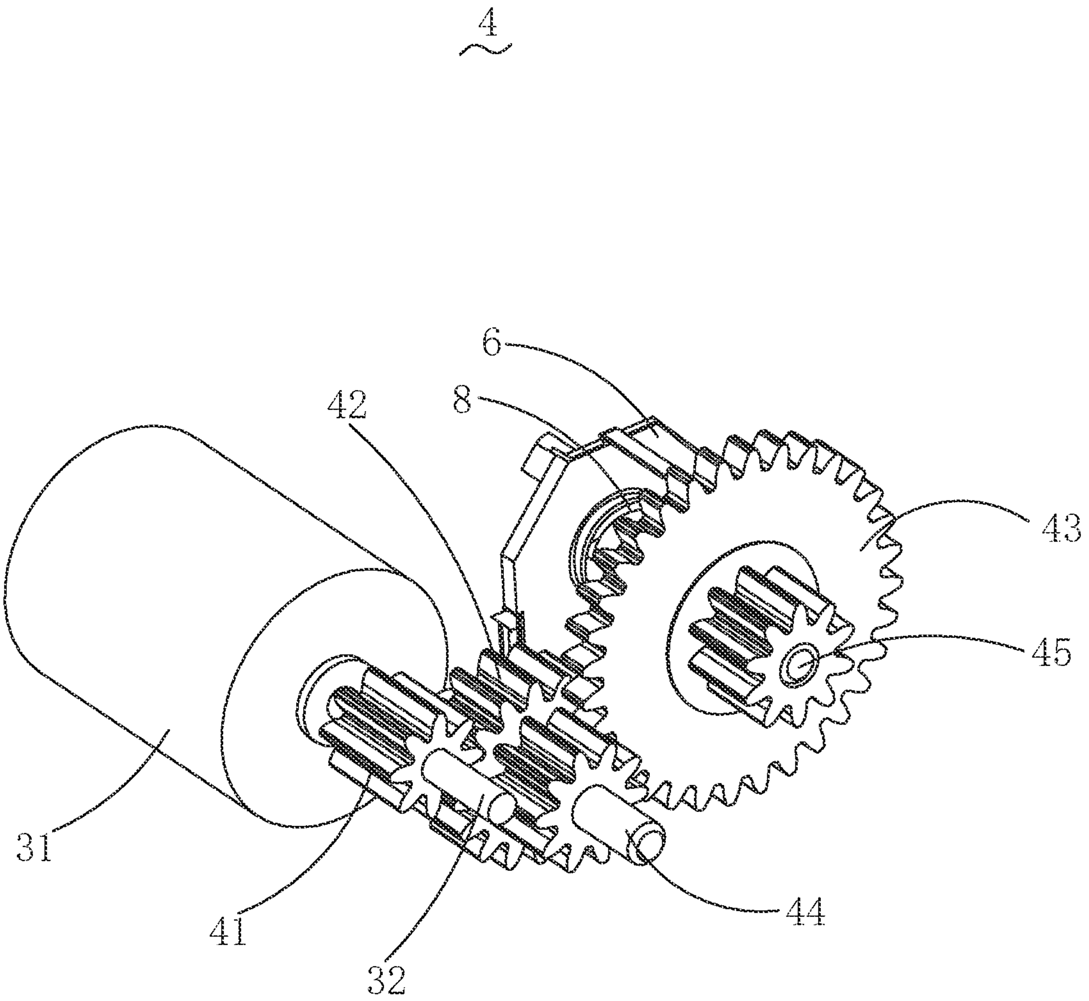
FIG. 3 is a view of a gear assembly of FIG. 2.
Figure 4:
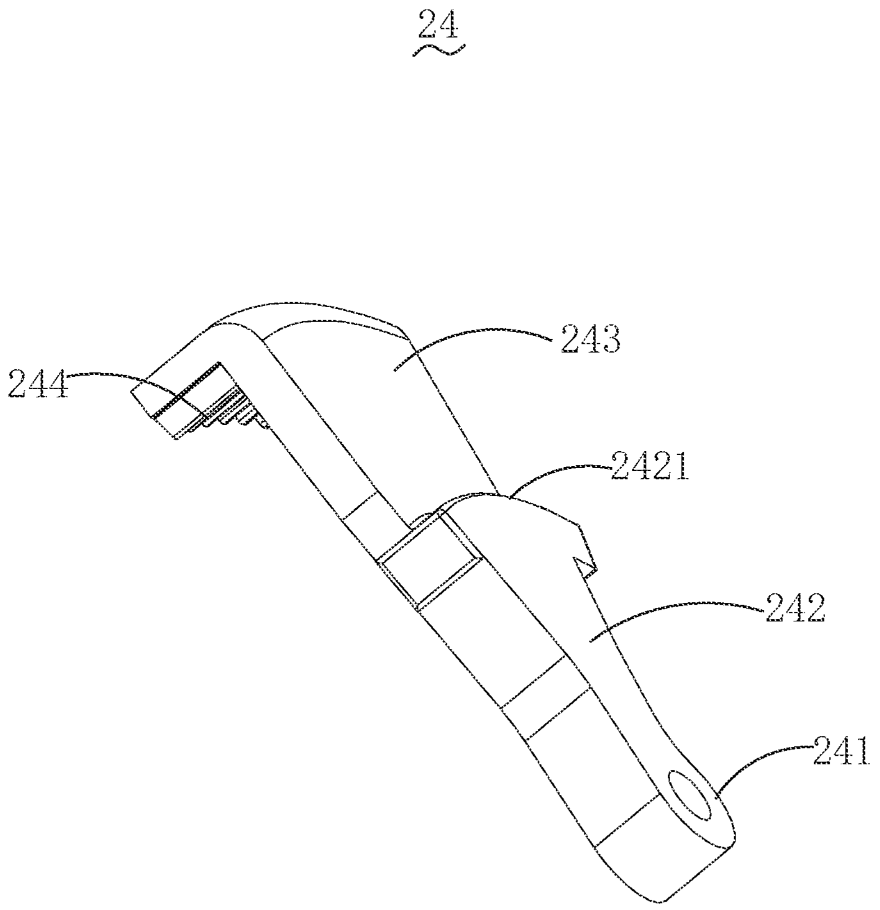
FIG. 4 is a structural view of a swing rod of FIG. 2.

Referring to FIGS. 1-4, provided is a force feedback device 100, including a base 1, a button assembly 2 rotatably arranged on the base 1, a gear assembly 4, and a driving assembly 3 fixed on the base 1.

The base 1 is configured to mount and support the button assembly 2, the gear assembly 4, and the driving assembly 3.

The button assembly 2 includes a button body 21, a button 22 formed by protruding and extending from the button body 21 in a direction away from the base 1, a first rotary shaft 23 connected to one side of the button body 21 close to the base 1 and rotatably connected to the base 1, and a swing rod 24 formed by extending from one side of the button body 21 close to the base 1 and rotatably connected to the first rotary shaft. The driving assembly 3 includes a driving unit 31 fixed on one side of the base 1 and an output shaft 32 connected to the driving unit 31. The gear assembly 4 is rotatably arranged on the base 1, one end of the gear assembly 4 is connected to the output shaft 32 in a transmission manner, and the other end of the gear assembly 4 is connected to the swing rod 24 in a transmission manner.

The driving unit 31 may be a motor.

In one embodiment, the button 22, the button body 21 and the first rotary shaft 23 are integrally formed.

Specifically, by pressing the button 22, the first rotary shaft 23 under the button body 21 rotates on the base 1, so as to drive the swing rod 24 fixed on one side of the first rotary shaft 23 to swing. One end of the gear assembly 4 is connected to the output shaft 32 in a transmission manner, and the other end of the gear assembly 4 is connected to the swing rod 24 in a transmission manner. The gear assembly 4 is driven to rotate by driving the output shaft 32 to rotate forwards and backwards by a motor, so as to achieve a swing effect on the swing rod 24, thereby driving the first rotary shaft 23 to rotate on the base 1, and further achieving a force feedback effect on the button 22 fixed on the first rotary shaft 23. The force feedback device of the present application has the advantages of compact overall space, reliable transmission, and large force feedback output, thereby facilitating the improvement of the user experience effect.

In this embodiment, the gear assembly 4 includes a first gear 41 fixed on the output shaft 32, a second rotary shaft 44 and a third rotary shaft 45 both arranged on the base 1 and connected to the base 1, a first duplex gear 42 connected to the second rotary shaft 44, and a second duplex gear 43 connected to the third rotary shaft 45. A large gear of the first duplex gear 42 is meshed with the first gear 41, and the small gear of the first duplex gear 42 is meshed with the large gear of the second duplex gear 43. the swing rod 24 is provided with an inner tooth structure 244 close to the second duplex gear 43, and the inner tooth structure 244 is meshed with the small gear of the second duplex gear 43. The drive unit 31 drives the output shaft 32 to rotate, so as to drive the first gear 41 to rotate. The first gear 41 drives the first duplex gear 42 to rotate. The other side of the first duplex gear 42 drives the second duplex gear 43 to rotate, and the swing rod 24 is provided with an inner tooth structure 244 close to the second duplex gear 43 to mesh with the second duplex gear 43, so that the second duplex gear 43 rotates to drive the swing rod 24 to swing, thereby driving the first rotary shaft 23 to rotate through the swing rod 24, and further achieving a force feedback effect of the button 22.

In one embodiment, the gear assembly 4 is driven by a three-stage gear, and may be adapted to the position requirements of a typical VR handle, and it may be combined into a suitable transmission ratio to meet an appropriate force requirement. Through a multi-stage gear, more space of size can be accommodated. Besides, with the benefit of reliable gear transmission, a relatively large transmission ratio can be achieved, and a relatively large feedback force can be transmitted.

Specifically, the first gear 41 is directly interference-fitted onto the output shaft 32. The first gear 41 is meshed with the first duplex gear 42, and the first duplex gear 42 is also meshed with the second duplex gear 43. The first duplex gear 42 is supported by its the first duplex gear 42, which has good lubrication at the rotation position, and a bearing 8 or a material having a self-lubricating effect may be selected. The second duplex gear 43 may be a gear with a shaft, or may be a gear interference-fit with the third rotary shaft 45. and the small gear of the second duplex gear 43 is engaged with the inner tooth structure on the swing rod 24. The swing rod 24 and the button 22 rotate around the same rotary shaft.

In this embodiment, the first rotary shaft 23 is arranged parallel to the output shaft 32, and the second rotary shaft 44 is arranged parallel to the third rotary shaft 45. The gear assembly 4 is a parallel shaft gear assembly, and the output shaft 32 of the electric motor is arranged parallel to the first rotary shaft 23 of the button 22. The parallel arrangement can reduce the length of the module, so that the gear assembly 4 can obtain a larger transmission ratio under the same intensity condition, thereby obtaining a larger force value feedback.

In this embodiment, the diameter of the first gear 41 is smaller than that of the first duplex gear 42, and the diameter of the first duplex gear 42 is smaller than that of the second duplex gear 43.

The diameter of the large gear of the first duplex gear 42 is larger than that of the first gear 41, and the diameter of the large gear of the second duplex gear 43 is larger than that of the first duplex gear 42.

Specifically, the first gear 41 is meshed with the large gear of the first duplex gear 42. The large gear of the second duplex gear 43 is meshed with the small gear of the first duplex gear 42, and the small gear of the second duplex gear 43 is meshed with the inner tooth structure 244. In this way, three-stage gear transmission is facilitated to achieve, and a deceleration effect can be effectively achieved. Meanwhile, the three-stage gear transmission can adapt to position requirements of the typical VR handle, and can be combined into a proper transmission ratio to meet a proper force requirement.

In this embodiment, the swing rod 24 is contacted with or separated from the button body 21. The swing rod 24 may be contacted with or separated from the button 22. When the swing rod 24 is contacted with the button 22, the push button may be provided with a pushing force to prevent the button 22 from being pressed down. The electric motor drives the gear assembly 4, so that the swing rod 24 containing the inner tooth structure rotates to contact with or separate from the button 22, thereby producing various force feedback effects.

In this embodiment, the swing rod 24 includes a connecting portion 241 fixed at one end of the first rotation shaft 23, an extending portion 242 extended from the connecting portion 241 to the gear assembly 4, and a transmission portion 243 extended from the extending portion 242, the cross-sectional area of which is gradually increased in the direction from the connecting portion 241 to the transmission portion 243. The transmission portion 243 has an arc structure, and an inner side of the transmission portion 243 is provided with an inner tooth structure 244. The inner tooth structure 244 is meshed with the small gear of the second duplex gear 43, so that the swing rod 24 swings along with the rotation of the second duplex gear 43 when the second duplex gear 43 rotates.

In this embodiment, the force feedback device 100 further includes a cover 5 detachably fixed to the base 1 and located outside the swing rod 24. The cover 5 is protruded to form an arc-shaped protrusion 51. An end of the extension part 242 is provided with an arc-shaped limiting portion 2421, and the limiting portion 2421 and the arc-shaped protrusion 51 are set to be contacted to achieve mutual limiting, thereby facilitating the limitation of the swinging position of the swing rod 24, and having high safety. Meanwhile, the arc-shaped limiting portion 2421 and the arc-shaped protrusion 51 are in arc-shaped contact with each other, thereby obtaining a small friction force is small, and a good definitive effect of the swinging position of the swing rod 24.

In this embodiment, the arc-shaped protrusion 51 is located on an axis of the second duplex gear 43. In order to reduce friction, the arc-shaped protrusion 51 has a width as small as possible. In this embodiment, the width has a size of 0.8 mm. The arc-shaped protrusion 51 is located at a center of the second duplex gear 43.

In this embodiment, the force feedback device 100 further includes a first position sensor 6 and a second position sensor 7. The first position sensor 6 is fixed on the third rotary shaft 45 and is configured to detect the swinging position of the swing rod 24. The second position sensor 7 is fixed on one side of the button body 21 close to the base 1 and is configured to detect the position of the button 22.

In this embodiment, the second position sensor 7 includes a Hall sensor 71 fixed on the base 1 and a magnetic steel 72 fixed on the button body 21, and the Hall sensor 71 is located within a magnetic field range of the magnetic steel 72. The position detection of the button 22 is implemented by the Hall sensor 71 and the magnetic steel 72 under the action of the magnetic field. In an embodiment, the second position sensor 7 may also be a pressure sensor configured to detect a pressure value of the button 22 on the base 1 to determine the position of the button 22.

In this embodiment, the force feedback device 100 further includes a torsion spring 9, which is sleeved on the first rotary shaft 23. One end of the torsion spring 9 is snap-fitted with the button 22, and the other end of the torsion spring 9 is snap-fitted with the base 1. The torsion spring 9 is mounted on one side of the button 22, so that the torsion spring 9 can provide a resilient force to the button 22 when the driving assembly 3 is not in operation. Besides, it ensures an initial force of the button 22, so that when the trigger is not in operation, the torsion spring serves as a constraint force of the button 22, thereby ensuring that the button 22 has a good experience effect. The force feedback device of the present embodiment can provide a resisting force for the button 22 after being acted on by the finger, and can also pull back the button 22 at the same time, so that a bidirectional force can be provided, thereby achieving a good force feedback effect. In an embodiment, one end of the torsion spring 9 is abutted against the button 22, and the other end of the torsion spring 9 is abutted against the base 1.

The working principle of the present application is as follows.

When the electric motor is not operating, the button 22 is only pushed by the torsion spring 9. When the button 22 is pressed by a finger, only the torsion spring 9 provides a resisting force, and the resisting force increases as the pressing is continued.

When the electric motor is operating, and the electric motor rotates clockwise, the swing rod 24 also rotates clockwise through the gear assembly 4, so that the swing rod 24 will contact the button 22, and provides a pushing force on the button 22. In this circumstance, when the button 22 is pressed, in addition to the spring force, the swing rod 24 driven by the motor also pushes the button 22. By adjusting the voltage of the motor, the magnitude of the pushing force can be controlled, thereby obtaining different pushing forces at different positions.

When the electric motor is operating, and the electric motor rotates counterclockwise, and the swing rod 24, driven by the gear assembly 4, also rotates counterclockwise, so that the swing rod 24 retracts and separates from the button 22, and no longer has a pushing effect on the button 22, which is convenient to operate and has a good user experience effect.

Compared with the related art, in the force feedback device of the present application, a button assembly is provided on a base for operation. Since the button assembly includes a button body, a button formed by protruding and extending from the button body in a direction away from the base, a first rotary shaft connected to one side of the button body close to the base and rotatably connected to the base, and a swing rod formed by extending from one side of the button body close to the base and rotatably connected to the first rotary shaft. The driving assembly includes a driving unit fixed on one side of the base, and an output shaft connected to the driving unit. The gear assembly is rotatably arranged on the base, one end of which is connected to the output shaft in a transmission manner, and the other end of which is connected to the swing rod in a transmission manner. The output shaft is driven by the driving unit to rotate forwards and backwards to drive the gear assembly to rotate, so as to achieve a swinging effect on the swing rod, thereby driving the first rotary shaft to rotate on the base, and further achieving a force feedback effect on a button fixed on the first rotary shaft. The force feedback device of the present application has the advantages of compact overall space, reliable transmission, and large force feedback output, thereby facilitating the improvement of the user experience effect.

Described above are only embodiments of the present application, and it should be noted that, for those skilled in the art, improvements may be made without departing from the concept of the present application, and these improvements all belong to the protection scope of the present application.

What is claimed is:

1. A force feedback device, comprising:
a base;
a button assembly, comprising:
a button body;
a button formed by protruding and extending from the button body in a direction away from the base;
a first rotary shaft connected to one side of the button body and rotatably connected to the base, wherein the base is closer to the one side of the button body than to an opposite side of the button body; and
a swing rod formed by extending from the one side of the button body and rotatably connected to the first rotary shaft;
a driving assembly comprising:
a driving unit fixed to one side of the base;
an output shaft connected to the driving unit;
a cover detachably fixed to the base and located outside the swing rod, and
a gear assembly rotatably arranged on the base, one end of the gear assembly being connected to the output shaft in a transmission manner, and the other end of the gear assembly being connected to the swing rod in a transmission manner, wherein,
the gear assembly comprises a first gear fixed to the output shaft, a second rotary shaft arranged on the base and connected to the base, a third rotary shaft arranged on the base and connected to the base, a first duplex gear connected to the second rotary shaft, and a second duplex gear connected to the third rotary shaft, a large gear of the first duplex gear is meshed with the first gear, a small gear of the first duplex gear is meshed with a large gear of the second duplex gear, the swing rod is provided with an inner tooth structure, and the inner tooth structure is meshed with a small gear of the second duplex gear,
the swing rod comprises a connecting portion fixed to one end of the first rotary shaft, an extending portion extended from the connecting portion to the gear assembly, and a transmission portion extended from the extending portion, a cross-sectional area of the extending portion is gradually increased in a direction from the connection portion to the transmission portion, the transmission portion is provided with an arc structure, and an inner side of the transmission portion is provided with an inner tooth structure, and
the cover is protruded to form an arc-shaped protrusion; an end of the extending portion is provided with an arc-shaped limiting portion, the arc-shaped protrusion is located on an axis of the second duplex gear, and the limiting portion is contacted with the arc-shaped protrusion to achieve mutual limiting.

2. The force feedback device of claim 1, wherein a diameter of the first gear is smaller than a diameter of the first duplex gear, and a diameter of the first duplex gear is smaller than a diameter of the second duplex gear.

3. The force feedback device of claim 1, wherein the swing rod is contacted with or separated from the button body.

4. The force feedback device of claim 1, further comprising a first position sensor and a second position sensor, wherein the first position sensor is fixed on the third rotary shaft, and the second position sensor is fixed on the one side of the button body.

5. The force feedback device of claim 4, wherein the second position sensor comprises a Hall sensor fixed on the base and a magnetic steel fixed on the button body, wherein the Hall sensor is located within a magnetic field range of the magnetic steel.

6. The force feedback device of claim 1, further comprising a torsion spring, wherein the torsion spring is sleeved on the first rotary shaft; one end of the torsion spring is snap-fitted with the button, and the other end of the torsion spring is snap-fitted with the base.

* * * * *